July 23, 1935.   W. C. DEAN   2,008,687
AUTOMATIC TENSION WINCH
Filed March 8, 1934   3 Sheets-Sheet 1

INVENTOR
WALTER C. DEAN
BY
Harold Dodd
ATTORNEY

July 23, 1935.  W. C. DEAN  2,008,687
AUTOMATIC TENSION WINCH
Filed March 8, 1934  3 Sheets-Sheet 2
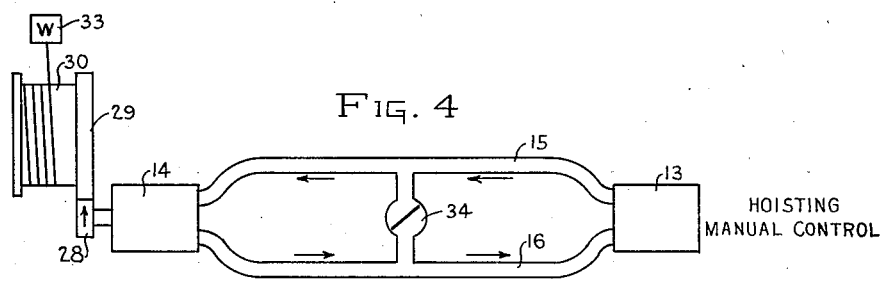
Fig. 4 — HOISTING MANUAL CONTROL
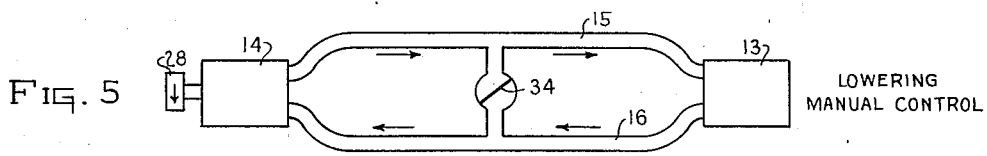
Fig. 5 — LOWERING MANUAL CONTROL
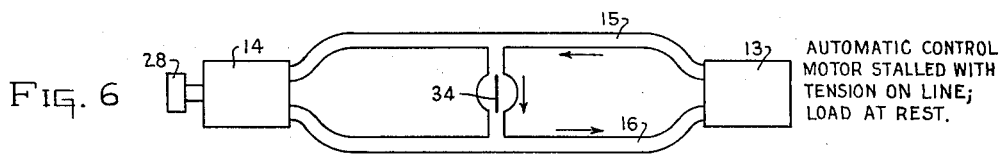
Fig. 6 — AUTOMATIC CONTROL MOTOR STALLED WITH TENSION ON LINE; LOAD AT REST.
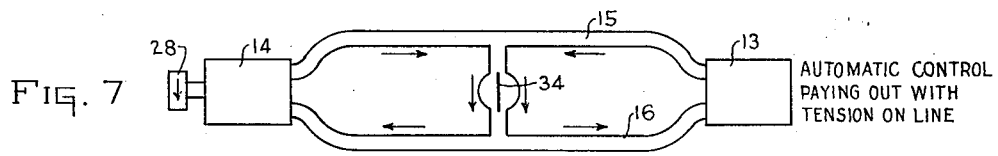
Fig. 7 — AUTOMATIC CONTROL PAYING OUT WITH TENSION ON LINE
INVENTOR
WALTER C. DEAN
BY
ATTORNEY July 23, 1935.    W. C. DEAN    2,008,687
AUTOMATIC TENSION WINCH
Filed March 8, 1934    3 Sheets-Sheet 3
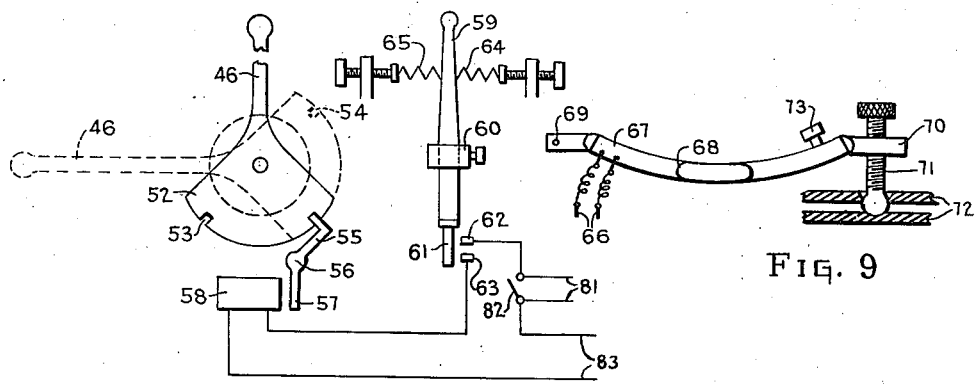
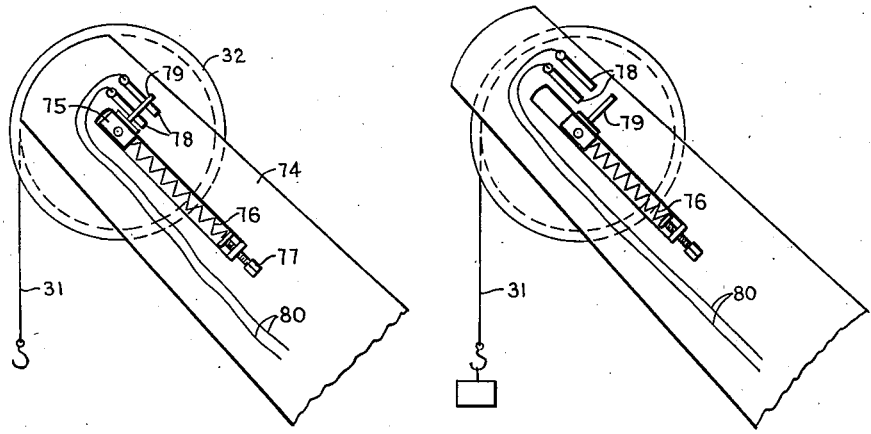
INVENTOR
WALTER C. DEAN
BY
Harold Dodd
ATTORNEY Patented July 23, 1935

2,008,687

UNITED STATES PATENT OFFICE 2,008,687

AUTOMATIC TENSION WINCH

Walter C. Dean, Chevy Chase, Md.

Application March 8, 1934, Serial No. 714,657

24 Claims. (Cl. 254—172)

(Granted under the act of March 3, 1883, as amended April 30, 1928; 370 O. G. 757)

This invention relates to mechanism for maintaining automatically a predetermined tension in a line that is wound on a winch drum to handle loads and more particularly adapted for use upon a tilting platform, such as the deck of a ship, to hoist to said platform loads that are rising and falling due to wave action. Another application is for mooring winches where the lines from a ship to a dock have to be adjusted due to changes in tide or ship's loading.

Among the objects of this invention are:

To provide means that will automatically take up slack in a line having one end connected to a load and the other wound on a winch, or pay out the line when the tension therein increases above a fixed maximum value;

To provide means for preventing the operation of the automatic mechanism when the load must be sustained by the line;

To provide a by-pass mechanism that will permit the automatic control of tension as above mentioned while the output of a variable delivery hydraulic pump used to operate the winch continues in the same direction.

In the drawings:

Fig. 4 shows diagrammatically the flow of the fluid in a hydraulic system embodying my invention when manual control is being used for hoisting;

Fig. 5 shows the flow of the fluid during lowering under manual control;

Fig. 6 shows the path of the fluid when the control is automatic, the load being at rest, and the hydraulic motor is stalled with the tension on the line;

Fig. 7 shows the movement of the fluid under automatic control when paying out the line;

Fig. 8 illustrates automatic control means to prevent shifting from automatic control to manual control except at a predetermined point in the roll of the platform;

Fig. 9 is an alternative mechanism for the same purpose as that shown in Fig. 8;

Figs. 10 and 11 illustrate automatic control means to prevent shifting from manual control to automatic control when the load is on the line.

I am aware that heretofore mechanism has been devised for preventing jerks upon the hoist lines that are being used to lift loads to a moving platform, as in raising an airplane that is floating on the water to the deck of a ship, but in all these mechanisms it is necessary that the direction of operation of the motive device be changed each time that the condition of the line changes from slack to load or vice versa. The present invention permits the source of power to operate continuously in one direction, both when winding in the line and when paying it out under automatic control.

Figure 1:
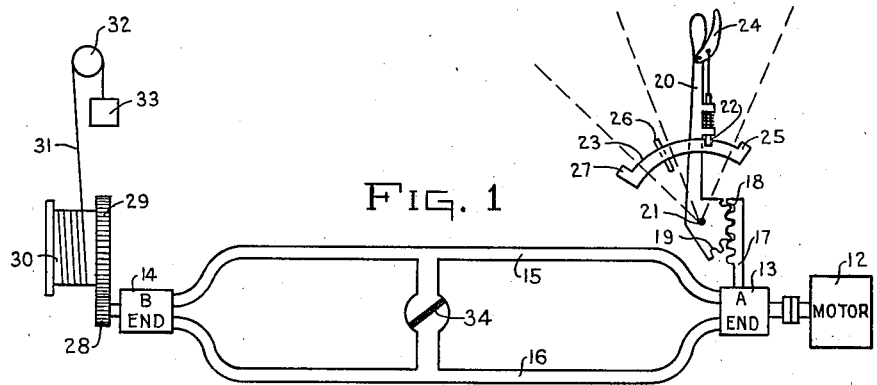
Fig. 1 is a schematic showing of the essential features of my invention.

In Fig. 1 the motor 12 is connected to drive a variable delivery pump 13, commonly termed the "A" end, of a hydraulic speed gear, the fluid from which is transmitted to and returned from the hydraulic motor, or "B" end, through pipes 15 and 16. The output of pump 13, both as to direction and quantity, is controlled by means of a spindle 17 having on it a toothed rack 18 meshed with a gear sector 19 carried by a hand lever 20 that is pivoted at 21, the center of curvature of sector 19. Lever 20 is held in the neutral, or no output position, of the pump controls by a detent 22 engaged in a slot in locking quadrant 23, the detent being disengageable from the slot by the usual hand latch 24. The output of the pump may be made a maximum in either direction of rotation thereof by movement of the lever between stop 25 and removable pin 26, this range being used for handling loads, but when there is no load on the line and it is desired to increase considerably the speed of motor 14 for winding in slack, the pin 26 may be removed and the lever 24 be moved all the way back to stop 27. Obviously, a pump having a rotary control spindle instead of one having a sliding movement may be used.

A pinion 28 is meshed with gear 29 on which drum 30 upon which is wound line 31 that passes over a supporting member 32 to hoist the load 33. The gears 28 and 29 are overhauling, that is, when the driving effort of hydraulic motor 14 exceeds the tension on line 31, load 33 will be hoisted, but when the tension on the line is greater than the effort of motor 14 the load 33 will fall and gears 29 and 28 will reverse the direction of operation of motor 14 and drive it as a pump, at which time the automatic by-pass valve 34 may be opened to permit the circulation of fluid shown in Fig. 7, as will be more fully described hereinafter, or the valve may be held closed and the pump be used as a brake to control the rate of descent of the load.

Figure 2:
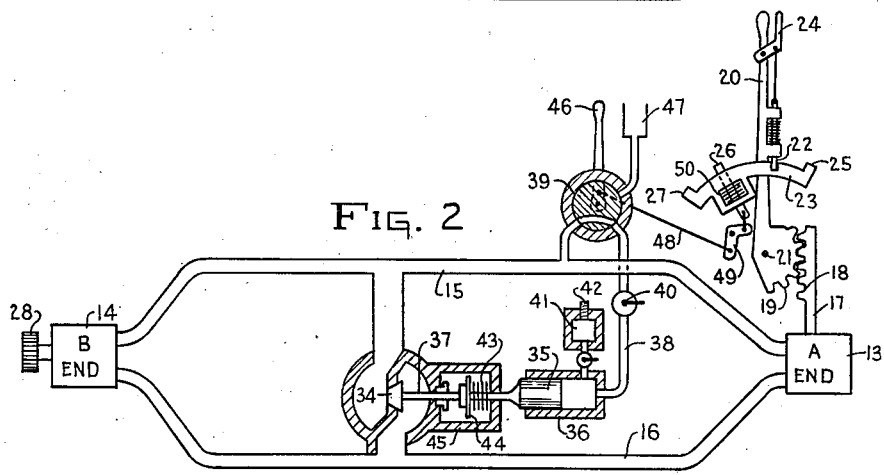
Fig. 2 shows in detail the parts of my invention set for manual control of the load.

Referring now to Fig. 2 it will be observed that by-pass valve 34 may be unseated under certain conditions, by pressure from pipe 15, but that it will always be moved toward its seat by pressure in pipe 16. For hoisting a load it is apparent that valve 34 must be kept closed, otherwise the fluid from pump 13 would be by-passed and would not drive motor 14. A piston 35 mounted in cylinder 36 is connected to stem 37 of valve 34, the cylinder 36 being connectible to pipe 15 through pipe 38 and three-way valve 39, as shown in Fig. 2, there being in pipe 38 a throttling valve 40. It is evident that with the valve 39 set as in Fig. 2, fluid from pipe 15 will enter cylinder 36 and exert a force upon piston 35 proportional to the pressure set up by the pump, which will hold the valve 34 on its seat. Cylinder 36 is connected to an expansion and air pressure chamber 41 that may be opened to atmosphere by removal of plug 42 for replenishing oil or for admitting air thereto. Valve 34 is held against its seat by a spring 43 disposed between a collar 44 on stem 37 and the inner face of the end wall of a housing 45.

Figure 3:
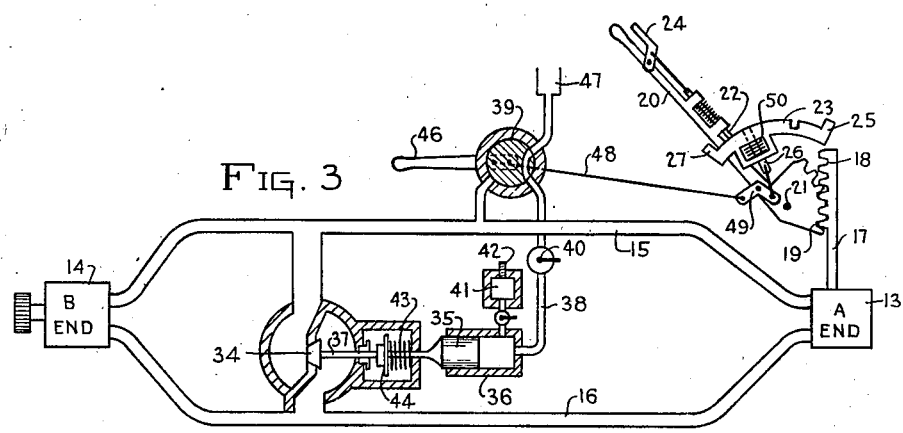
Fig. 3 is similar to Fig. 2 but discloses the mechanism set for automatic control.

When the mechanism is to be automatically controlled, lever 46 is turned to the horizontal position shown in Fig. 3, which rotates valve 39 to disconnect pipe 38 from pipe 15 and connects pipe 38 to an expansion tank 47 at atmospheric pressure, under which conditions valve 34 is held against its seat by spring 43 only, the tension of which is adjustable by changing the position of collar 44 to permit valve 34 to be unseated by pressure in pipe 15 when the load on motor 14 exceeds a predetermined magnitude. If, for example, it be desired to maintain a tension of fifty pounds on the line 31, the spring 43 will hold valve 34 on its seat at all pressures in pipe 15 up to that which is required to exert a tension of fifty pounds upon line 31, but when the pressure in pipe 15 exceeds that value, valve 34 is unseated and the liquid is by-passed through the valve to pipe 16 and back to pump 13 and thus limits the driving force of motor 14 to that desired. As valve 34 is unseated the piston 35 is moved back in cylinder 36 which forces the fluid from the cylinder through pipe 38 to tank 47 at a rate controlled by the degree of opening of valve 40 but immediate unseating of the valve 34 is made possible by passage of fluid into the chamber 41, which fluid is later forced by the air compressed in chamber 41 due to entry of the fluid into that chamber to pass through pipe 38 to tank 47. This air-spring action of chamber 41 results in smoother and better operation of the valve mechanism. The capacity of valve 34 is preferably twice the output of pump 13 since, when the load is driving motor 14 as a pump while pump 13 continues to force fluid through pipe 15, the two streams of fluid must pass through valve 34, as shown in Fig. 7.

Connected to the lever 46 at a distance from the pivotal center thereof is a member 48 that is also connected to one arm of a bell crank lever 49 pivotally mounted at the elbow of the lever, the other arm of lever 49 being connected to the movable pin 26 to withdraw the pin from the path of lever 20 and so permit the moving of lever 20 back to stop 27 which gives pump 13 the maximum output for winding in the line at high speed under automatic control. Pin 26 is normally held in the path of lever 20 by the action of spring 50 which tends to move the pin upwardly.

It is apparent that there are certain times when it would be undesirable to change from manual control to automatic control or the reverse. For example, if the change from manual control to automatic control were made when a load exceeding that for which valve 34 is set was partially hoisted, a damaging impact of the load against the surface beneath it would occur; also, if the line were paying out under automatic control and the device were shifted to manual control, the resulting jerk on the line would either rupture the line or seriously damage the load. The relative movement between the tilted platform and the load is zero at both the lowest point of the roll and at the highest point of the roll but since the movements of the platform and of the load are relatively converging at this latter point, it would be undesirable to change to manual control and being to hoist the load at that time. I have therefore provided means for preventing the change from one type of control to the other except at the lowest point in the roll. If hoisting is begun at that time the load and the platform will be in the most favorable relative positions and the load can be raised a sufficient distance that it will not contact the surface upon the next downward roll of the platform. In Fig. 8 the lever 46 is shown to be provided with a sector 52 having in it two slots 53 and 54 that are engageable by a pawl 55 pivotally mounted at 56 and having an arm 57 disposed to be attracted by solenoid 58 when the solenoid is energized. A pendulum 59, mounted to swing athwartship, has on it a movable weight 60 and a contacting element 61 adapted to close the circuit through contacts 62 and 63 when the pendulum swings so that member 61 bridges the gap between the two contacts. By adjusting the tension in control springs 64 and 65 and the position of weight 60, the amplitude of swing of pendulum 59 can be made such that the circuit through contacts 62 and 63 will be closed at the lowest point in the roll of the platform toward the load, which will energize solenoid 58 and thereby release pawl 55 from engagement with sector 52 and leave lever 46 free to be moved to change from automatic to manual control or vice versa.

Another device that accomplishes the same results is shown in Fig. 9. The wires 66 are sealed into a down-bowed tubular member 67 of electrically non-contacting material in which is a mass 68 of mercury, the member 67 being disposed to extend athwartship. The gap between the sealed-in ends of wires 66 has the same function and position in the circuit as does that between contacts 62 and 63 in Fig. 8. The one end of tube 67 is pivotally supported at 69 and the other end thereof is connected to an internally threaded element 70 engaged with the threads on screw 71 which has a ball and socket connection with members 72 to permit tilting thereof but prevent removal of the screw therefrom. When the platform tilts in the proper direction, mercury 68 will envelop the ends of wires 66 and close the circuit through wires 83 which energizes solenoid 58 and releases the coacting lever 46. The degree of roll necessary to effect closing of the circuit may be varied by turning screw 71 whereby the end of tube 67 that is connected thereto will be raised or lowered. The quantity of mercury in the tube 67 may be varied by adding thereto or taking therefrom through the aperture closed by member 73.

Regardless of the position of the platform with respect to roll it would be undesirable to change from manual control to automatic control while hoisting a load. To prevent this, I have provided the means shown in Figs. 10 and 11 wherein the sheave 32 over which line 31 passes is slidably mounted in the boom 74, the blocks 75 in which the sheave is journalled being normally held in the position shown in Fig. 10 by spring 76 whereof the tension is adjustable by a screw 7. Spaced contacts 78 are disposed to be bridged by an element 79 and thus to close the circuit through the solenoid 58 when in the position shown in Fig. 10. Tension on line 31 greater than a predetermined value will compress the spring 76 and move element 79 to break the circuit through contacts 78 which are connected by wires 80 to the wires 81 (Fig. 8). When switch 82 is opened the current from supply wires 83 must pass through wires 80 and hence if the circuit be broken at contacts 78 the closing of the circuit at contacts 62 and 63 will not release pawl 55 to permit movement of lever 46. When it is desired to have operation of lever 46 dependent on the roll of the platform only, switch 82 is closed which shunts out the circuit that includes wires 81, 80, etc.

With lever 20 in neutral position the delivery control of pump 13 is also in the neutral position and consequently the pump executes no stroke and delivers no oil. The motor 14 and drum 30 are then at rest. Moving 20 to the right shifts control spindle 17 down into the pump and causes the fluid from pump 13 to be delivered to motor 14 through pipe 16 and be returned through pipe 15 which lowers the load, the pump acting as a brake due to its fixed output. The circulation of the fluid during this operation is shown in Fig. 5. The reverse operation for hoisting the load is schematically illustrated in Fig. 4, when lever 20 is moved to right and control spindle 17 is raised.

When automatic control lever 46 is rotated to the left, as seen in Fig. 2, pin 26 is withdrawn which permits moving the lever 20 to its extreme position at the left and opens the pump control to its maximum delivery in the hoisting direction and causes motor 14 to be driven to hoist the hook at a rate of say 300 feet per minute, but inasmuch as this rate of delivery of pump 13 would overload the motor 12 if the line 31 were carrying a load, this is never used except for taking up slack. When in automatic control, if the load, as a hydroplane, drops into the trough of a wave or if the ship upon which the hoisting apparatus is mounted rolls away from the load, the tension on the line causes the winch to drive motor 14 as a pump and forces fluid back through pipe 15 which unseats valve 34 and by-passes the fluid as shown in Fig. 7, the pump 13 continuing its operation in the direction for hoisting meanwhile and therefore as soon as the tension on the line is sufficiently decreased valve 34 is again seated and motor 14 is driven at high speed to wind in line 31 and to keep it taut. If the load remains stationary the motor 14 is stalled with the predetermined tension exerted upon line 31 and the fluid from pump 13 is by-passed through valve 34 as indicated in Fig. 6.

Jerks on the line when going quickly from manual to automatic control or when all slack has been taken up and the load is suddenly applied or when quickly changing from automatic to manual control are prevented by the hydraulic slippage controlled by the cushioning action of the air in chamber 41 and the effect of throttling valve 40. A sudden jerk on line 31, during automatic operation, will unseat valve 34 and cause the by-passing of the fluid and if the additional load is but momentary the air pressure in chamber 41 will cause the fluid to flow back into cylinder 36 and reseat valve 34 but if continued the fluid will be forced through pipe 38 to tank 47 at a rate controlled by throttling valve 40.

The herein described invention may be manufactured and used by or for the United States Government for governmental purposes, without the payment of any royalty thereon.

I claim:

1. The combination with a variable delivery pump having a movable control device and a hydraulic motor connected to said pump to be driven by fluid therefrom, of a drum drivingly connected to said motor, a boom, a pulley mounted on said boom for limited sliding movement, a cable over said pulley connected to said drum to be wound thereon, resilient means acting on said pulley to move it in the direction opposed to the force exerted thereon by a load on said cable, a pair of electric contacts on said boom, a member carried by the pulley mounting to close the circuit through said contacts when the load on the cable is insufficient to overcome said resilient means, means between said motor and said pump to control automatically the tension in said cable, means to render said automatic means operative or inoperative, means to lock said last mentioned means, and electric means connected in circuit with said contacts to release said locking means when the circuit is closed through said contacts.

2. The combination with a variable delivery pump having a movable control device and a hydraulic motor connected to said pump to be driven by fluid therefrom, of a drum drivingly connected to said motor, a boom, a pulley mounted on said boom for limited sliding movement, a cable over said pulley connected to said drum to be wound thereon, resilient means acting on said pulley to move it in the direction opposed to the force exerted thereon by a load on said cable, a pair of electric contacts on said boom, a member carried by the pulley mounting to close the circuit through said contacts when the load on the cable is insufficient to overcome said resilient means, means between said member and said pump to control automatically the tension in said cable, means to render said automatic means operative or inoperative, means to lock said last mentioned means, manually movable means to actuate said control device, means to limit the movement of said manually movable means in one direction, and means operatively connected to the third mentioned means to render said limiting means inoperative simultaneously with rendering said automatic means operative.

3. The combination with a variable delivery pump having a movable control device and a hydraulic motor connected to said pump to be driven by fluid therefrom, of a drum drivingly connected to said motor, a cable connected to said drum to be windable thereon, means to control automatically the tension in said cable, means to render said automatic means operative or inoperative, means to manipulate the controls of said pump, means to limit the operation of the last mentioned means in one direction, and means connected to the second mentioned means to render said limiting means inoperative simultaneously with placing said automatic means in the operative condition.

4. The combination with a variable delivery pump having a movable control device and a hydraulic motor connected to said pump to be driven by fluid therefrom, of a drum drivingly connected to said motor, a cable connected to said drum to be windable thereon, means adjustable to function automatically to by-pass fluid from said pump around said motor when the load on said cable exceeds a predetermined magnitude, means to render the aforesaid means operative or inoperative, means to limit the operation of said control device in one direction, and means connected to said second mentioned means to render said limiting means inoperative simultaneously with placing said automatic means in the operative condition.

5. The combination with a variable delivery pump having a movable control device and a hydraulic motor connected to said pump to be driven by fluid therefrom, of a drum drivingly connected to said motor, a cable connected to said drum to be windable thereon, automatically acting means to by-pass fluid from said pump around said motor when the load on said cable exceeds a predetermined magnitude, means to render the aforesaid means operative or inoperative, means to limit the operation of said control device in one direction, and means connected to said second mentioned means to render said limiting means inoperative simultaneously with placing said automatic means in the operative condition.

6. The combination with a hydraulic speed gear having a driving end, a driven end connected thereto by two pipes and means to control the fluid delivery of said driving end, of a valve operatively connected to both of said pipes between said ends, said valve having a capacity of substantially double the output capacity of the driving end and disposed to be unseated by pressure from one pipe, adjustable loading means to urge said valve against its seat, a piston operatively connected to the valve to hold the valve seated, a cylinder in which said piston is mounted, means to connect said cylinder either to said one pipe or to atmospheric pressure, a throttling valve in said connecting means, and air cushion means connected to receive fluid from said cylinder upon movement of the piston into the cylinder.

7. The combination with a hydraulic speed gear having a driving end, a driven end connected thereto by two pipes and means to control the fluid delivery of said driving end, of a valve operatively connected to both of said pipes between said ends, said valve having a capacity of substantially double the output capacity of the driving end and disposed to be unseated by pressure from one pipe, adjustable loading means to urge said valve against its seat, a piston operatively connected to the valve to hold the valve seated, a cylinder in which said piston is mounted, means to connect said cylinder either to said one pipe or to atmospheric pressure, and a throttling valve in said connecting means.

8. The combination with a hydraulic speed gear having a driving end, a driven end connected thereto by two pipes and means to control the fluid delivery of said driving end, of a valve operatively connected to both of said pipes between said ends, said valve having a capacity of substantially double the output capacity of the driving end and disposed to be unseated by pressure from one pipe, adjustable loading means to urge said valve against its seat, a piston operatively connected to the valve to hold the valve seated, a cylinder in which said piston is mounted, and means to connect said cylinder either to said one pipe or to atmospheric pressure.

9. The combination with a hydraulic speed gear having a driving end, a driven end connected thereto by two pipes and means to control the fluid delivery of said driving end, of a valve operatively connected to both of said pipes between said ends, said valve having a capacity of substantially double the output capacity of the driving end and disposed to be unseated by pressure from one pipe, adjustable loading means to urge said valve against its seat, and means selectively settable either to apply pressure in said one pipe to hold the valve on its seat or to place said valve solely under the control of the loading means.

10. The combination with a hydraulic speed gear having a driving end, a driven end connected thereto by two pipes and means to control the fluid delivery of said driving end, of a valve operatively connected to both of said pipes between said ends, said valve having a capacity greater than the output capacity of the driving end and disposed to be unseated by pressure from one pipe, adjustable loading means to urge said valve against its seat, a piston operatively connected to the valve to hold the valve seated, a cylinder in which said piston is mounted, means to connect said cylinder either to said one pipe or to atmospheric pressure, and means to limit the operation of said control means operatively connected to the last mentioned means to render said limiting means inoperative when said last mentioned means is in position to connect said cylinder to atmospheric pressure.

11. The combination with a hydraulic variable speed gear having a driving end, a driven end connected thereto by two pipes and means to control the fluid delivery of said driving end, and a valve operatively connected to both said pipes between said ends, said valve being disposed to be unseated by pressure from one pipe, and adjustable load means to urge said valve against its seat, means selectively settable either to apply pressure in said one pipe to hold the valve on its seat or to place said valve solely under the control of the loading means, and means to limit the operation of said control means operatively connected to the last mentioned means to render the limiting means inoperative when said valve is controlled solely by the loading means.

12. The combination with a hydraulic variable speed gear having a driving end, a driven end connected thereto by two pipes and means to control the fluid delivery of the driving end, of means to by-pass fluid from the driving end around the driven end in response to a load on said driven end in excess of a predetermined magnitude and means actuatable by the pressure set up by the driving end to prevent operation of said by-pass means.

13. The combination with a hydraulic variable speed gear having a driving end and a driven end and means to control the delivery of said driving end, of a drum drivingly connected to said driven end, a cable connected to said drum to be wound thereon, means to limit the operation of said control means in the direction to wind the cable on said drum, automatic means to cause said driven end to wind said cable on the drum when the load on the cable is less than a predetermined value or permit the load to unwind the cable from the drum when the said load is greater than the said value, means to render said automatic means operative or inoperative at will, and means connected to said last mentioned means and to said limiting means to render said limiting means inoperative when said automatic means is operative.

14. A winch mechanism adapted for use on a tilting platform, comprising the combination with a hydraulic variable speed gear having a driving end and a driven end and means to control the delivery from said driving end, of a drum, reversible driving means between said drum and said driven end, a cable connected to said drum to be wound thereon, automatic by-pass means to pass fluid from said driving end around said driven end when the load on said drum exceeds a predetermined magnitude, means to render said by-pass means operative or inoperative, means to lock the last mentioned means, electric means to release the said lock, means actuated by movement of the mechanism with the platform to close at one point an electric circuit through said electric means at the moment of greatest tilt in the direction of extent of said cable, other means to close said circuit at a second point through said electric means when the load on said cable is less than a predetermined value, means to limit the movement of said control means in one direction, and means connected to said limiting means and to the means for rendering said by-pass means operative or inoperative to render said limiting means ineffective when said by-pass means is operative.

15. A winch mechanism adapted for use on a tilting platform, comprising the combination with a hydraulic variable speed gear having a driving end and a driven end and means to control the delivery from said driving end, of a drum, reversible driving means between said drum and said driven end, a cable connected to said drum to be wound thereon, automatic by-pass means to pass fluid from said driving end around said driven end when the load on said drum exceeds a predetermined magnitude, means to render said by-pass means operative or inoperative, means to lock the last mentioned means, electric means to release said lock, means actuated by movement of the mechanism with the platform to close at one point an electric circuit through said electric means at the moment of greatest tilt in the direction of extent of said cable, and other means to close said circuit at a second point through said electric means when the load on said cable is less than a predetermined value.

16. A winch mechanism for use on a tilting platform, comprising the combination with a source of power, of a drum driven by said source, a cable windable on said drum, automatic means to apply the power to wind said cable on said drum when the load is of less than a predetermined magnitude or to permit said load to unwind said cable when the load is greater than said magnitude, a device to render said automatic means operative or inoperative, means to lock said device in the inoperative position of the automatic means, electric means to release said locking means, a circuit to conduct current to said electric means, including spaced contact members, a pendulum, a bridging member carried by said pendulum to close the circuit through said contacts when caused by tilting of the platform to swing against them, and means acting on said pendulum to hold said bridging member normally away from said contacts.

17. A winch mechanism for use on a tilting platform, comprising the combination with a source of power, of a drum driven by said source, a cable windable on said drum, automatic means to apply the power to wind said cable on said drum when the load is of less than a predetermined magnitude or to permit said load to unwind said cable when the load is greater than said magnitude, a device to render said automatic means operative or inoperative, means to lock said device in the inoperative position of the automatic means, electric means to release said locking means, a circuit to conduct current to said electric means including spaced contact members, a down-bowed tubular element of insulating material into one end of which said contacts project, and a globule of electrically conducting liquid in said element to close the circuit through said contacts when moved by tilting of the platform to envelope both said contacts.

18. A winch mechanism for use on a tilting platform, comprising the combination with a source of power, of a drum driven by said source, a cable windable on said drum, automatic means to apply the power to wind said cable on said drum when the load is less than a predetermined magnitude or to permit said load to unwind said cable when the load is greater than said magnitude, a device to render said automatic means operative or inoperative, means to lock said device in the inoperative position of the automatic means, electric means to release said locking means, a circuit to conduct current to said electric means including spaced contact members, and means actuatable by tilting of the platform to close the circuit through said contacts.

19. A winch mechanism for use on a tilting platform, comprising the combination with a source of power, of a drum driven by said source, a cable windable on said drum, automatic means to apply the power to wind said cable on said drum when the load is less than a predetermined magnitude or to permit said load to unwind said cable when the load is greater than said magnitude, a device to render said automatic means operative or inoperative, means to lock said device in the inoperative position of the automatic means, electric means to release said locking means, a circuit to conduct current to said electric means including spaced contact members at each of two points in said circuit, means actuatable by tilting of the platform to close the circuit through the contacts at one of said points and other means responsive to the load on said cable to close the circuit at the other of said points when said load is less than a predetermined magnitude.

20. The combination with a driving device and a driven device, of a drum having a reversible driving connection with said driven device, a cable windable on said drum, automatic means to cause said cable to be wound on said drum or paid out in response to a decrease of load on the cable below or increase of the load above a predetermined value, respectively, the direction of operation of the driving device remaining unchanged, means to render said automatic means inoperative and cause said driving device positively to control said drum, means responsive to the position of the mechanism with respect to the horizontal to prevent changing from positive control to automatic control except in a predetermined position with respect to the horizontal, and means responsive to the load on said cable to prevent the said change when the load exceeds a predetermined magnitude.

21. The combination with a driving device and a driven device, of a drum having a reversible driving connection with said driven device, a cable windable on said drum, automatic means to cause said cable to be wound on said drum or paid out in response to a decrease of load on the cable below or increase of the load above a predetermined value, respectively, means to render said automatic means inoperative and cause said driving device positively to control said drum, means responsive to the position of the mechanism with respect to the horizontal to prevent changing from positive control to automatic control except in a predetermined position with respect to the horizontal, and means responsive to the load on said cable to prevent said change when the load exceeds a predetermined magnitude.

22. The combination with a driving device and a driven device, of a drum having a reversible driving connection with said driven device, a cable windable on said drum, automatic means to cause said cable to be wound on said drum or paid out in response to a decrease of the load on the cable below or increase above a predetermined value, respectively, means to render said automatic means inoperative and cause said driving device positively to control said drum, and means responsive to the position of the mechanism with respect to the horizontal to prevent changing from positive control to automatic control except in a predetermined position with respect to the horizontal.

23. The combination of a driving device and a driven device, of a drum having a reversible driving direction with said driven device, a cable windable on said drum, automatic means to cause said cable to be wound on said drum or paid out in response to decrease of the load on said cable below or increase above a predetermined value, respectively, means to render said automatic means inoperative and cause said driving device positively to control said drum, and means responsive to the load on said cable to prevent the said change when the said load exceeds a predetermined magnitude.

24. The combination with a hydraulic variable speed gear having a driving end and a driven end connected thereto by two pipes and means to control the fluid delivery of the driving end, of a valve to by-pass fluid from the driving end around the driven end in response to a load on said driven end in excess of a predetermined magnitude, and means selectively operable by pressure from said driving end to maintain said valve against its seat.

WALTER C. DEAN.